2,825,026
METHOD FOR DETERMINING THE OIL CONTENT OF SUBSTANCES

Charles E. Holaday, Arlington, Va., Harry F. Cooke, Little Rock, Ark., Wilbur K. Marble, Stoneville, Miss., and John E. Larrison, Syracuse, N. Y.

No Drawing. Original application May 27, 1955, Serial No. 511,812. Divided and this application March 29, 1956, Serial No. 577,432

3 Claims. (Cl. 324—61)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

The patent rights for the United States in any invention in the patent to be granted on this application are dedicated to the public.

This invention relates to a process for determining the oil content of seeds. More particularly, it relates to a process for determining the oil content of cottonseed and other oil-bearing seeds by measuring the dielectric constant of an extract in a solvent whose dielectric constant is known.

If two liquids having different dielectric values are intimately mixed, as by forming a solution of one in the other, the resultant mixture will have a dielectric value dependent on the relative proportions of the two components. When the dielectirc values of the pure substances and of a plurality of mixtures of known proportions are charted, the proportions in an unknown mixture may be calculated from the observed dielectric value of the mixture.

An object of this invention is to provide method for determining the percentage of oil in cottonseed by measuring the variations in dielectric properties of a number of different solutions of oil in a solvent, such as orthodichlorobenzene.

A preferred procedure for preparing an extract of cottonseed for measuring its oil content in accordance with this invention is as follows: The first step involves the extraction of oil from 50 grams of cottonseed in a high speed grinder using 250 grams of orthodichlorobenzene as the extractant. This particular weight ratio of seed to solvent was found to be efficient and economical for cottonseed. However, for other oil seeds a different weight ratio of oil to solvent may be equally suitable. Before the extracion is started, 30 to 40 grams of anhydrous calcium chloride (hydrophilite) are added. The anhydrous calcium chloride has a desiccating action which prevents moisture in the seed from becoming absorbed by the oil-orthodichlorobenzene mixture. Although the literature states that water is practically insoluble in both oil and orthodichlorobenzene, sufficient absorption takes place when water is present in the test specimen to materially affect the dielectric properties of the extract. Thus by using anhydrous calcium chloride as an additive before the extraction, the oil content of any sample of seed may be determined regardless of its natural moisture content. Other drying agents may be used, care being taken, however, to avoid the use of materials, such as, aluminum oxide, which will adsorb some of the oil and thus make any determination erroneous.

In the second step of the procedure the oil-orthodichlorobenzene solution is separated from the macerated seed. Lint and larger hull particles are removed by pouring the ground mass of seed through a 40 mesh screen which is soldered to the lower inside walls of a metal cylinder. The bottom of the cylinder is attached to a funnel which is inserted into the inlet of an air filter press which utilizes a commercial filter paper as the filtering medium and which serves to remove the fine meat and hull particles. Ground mass remaining on the screen is first pressed with a wooden plunger to remove as much of the adhering liquid portion as possible. About 5 to 10 pounds of air pressure per square inch is adequate for efficient filtration of a fluid mixture for determining the oil content with the apparatus. The solution is now ready for determination of its dielectric properties.

A suitable apparatus for making this determination is disclosed in application Ser. No. 511,812, filed May 27, 1955, of which the present application is a division.

By using the above-described process, it is possible to carry out a determination of the oil content of a sample of cottonseed with great accuracy in a few minutes. The present official chemical method of analysis requires elaborate equipment and a minimum of 12 hours for completion.

We claim:
1. A process for determining the oil content of seeds which comprises adding to a standard weight of seed a standard volume of organic solvent for the oil, said organic solvent having a known dielectric constant, and a desiccant in sufficient amount to absorb water normally present in the seed and to prevent absorption of said water by the solution of oil, said desiccant being insoluble in both the oil and the organic solvent and being nonabsorbent for both the oil and organic solvent, macerating the mixture of seed, organic solvent, and desiccant, separating the solution of oil in organic solvent from the macerated seed and desiccant, and measuring the dielectric constant of the solution.

2. The process of claim 1 wherein the desiccant is anhydrous calcium chloride.

3. The process of claim 1 wherein the organic solvent is orthodichlorobenzene.

References Cited in the file of this patent
UNITED STATES PATENTS

| | | |
|---|---|---|
| 1,076,997 | Riddle | Oct. 28, 1913 |
| 1,610,270 | Ehrlich | Dec. 14, 1926 |
| 2,616,909 | Carter | Nov. 4, 1952 |
| 2,617,299 | Ennis et al. | Nov. 11, 1952 |